Figure 6:
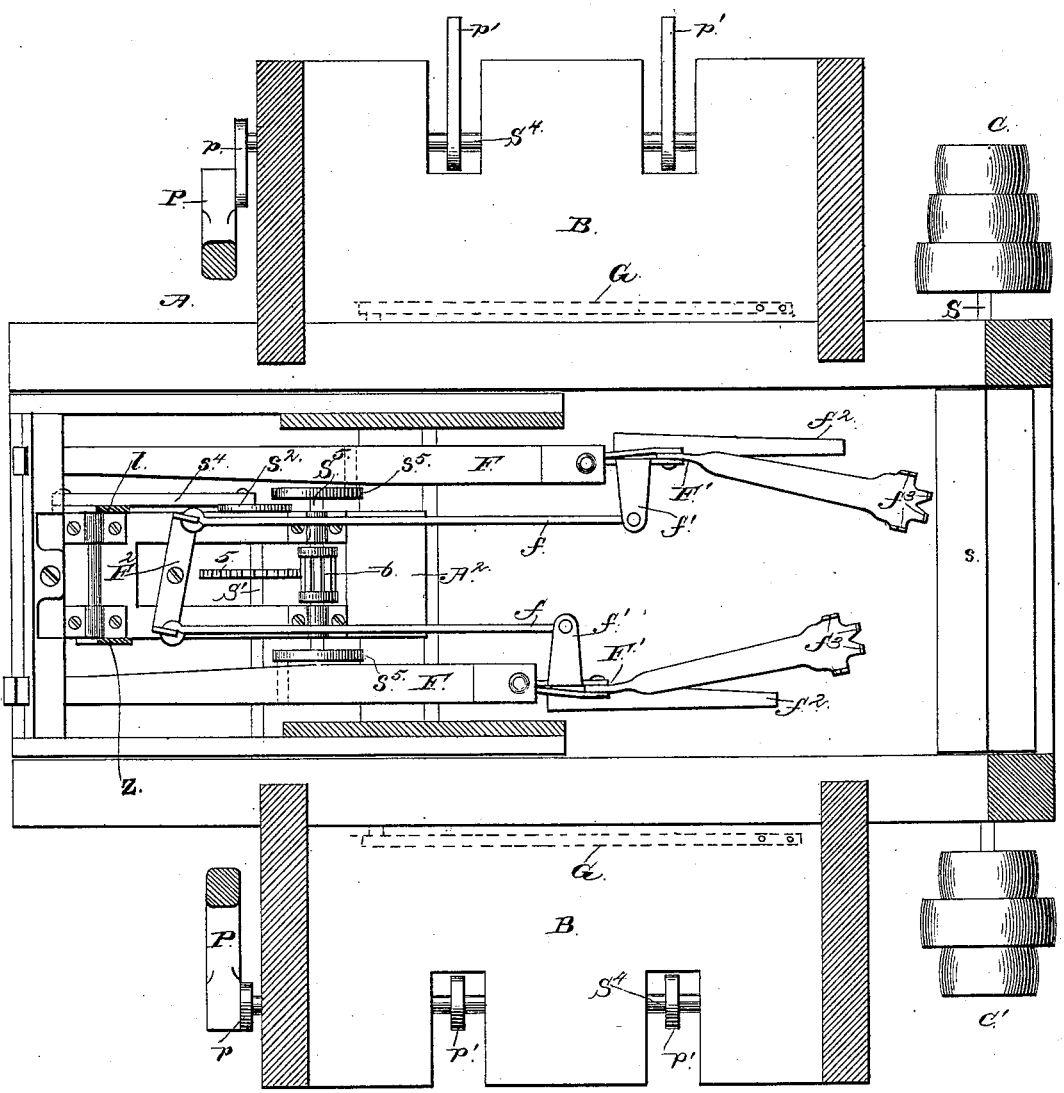

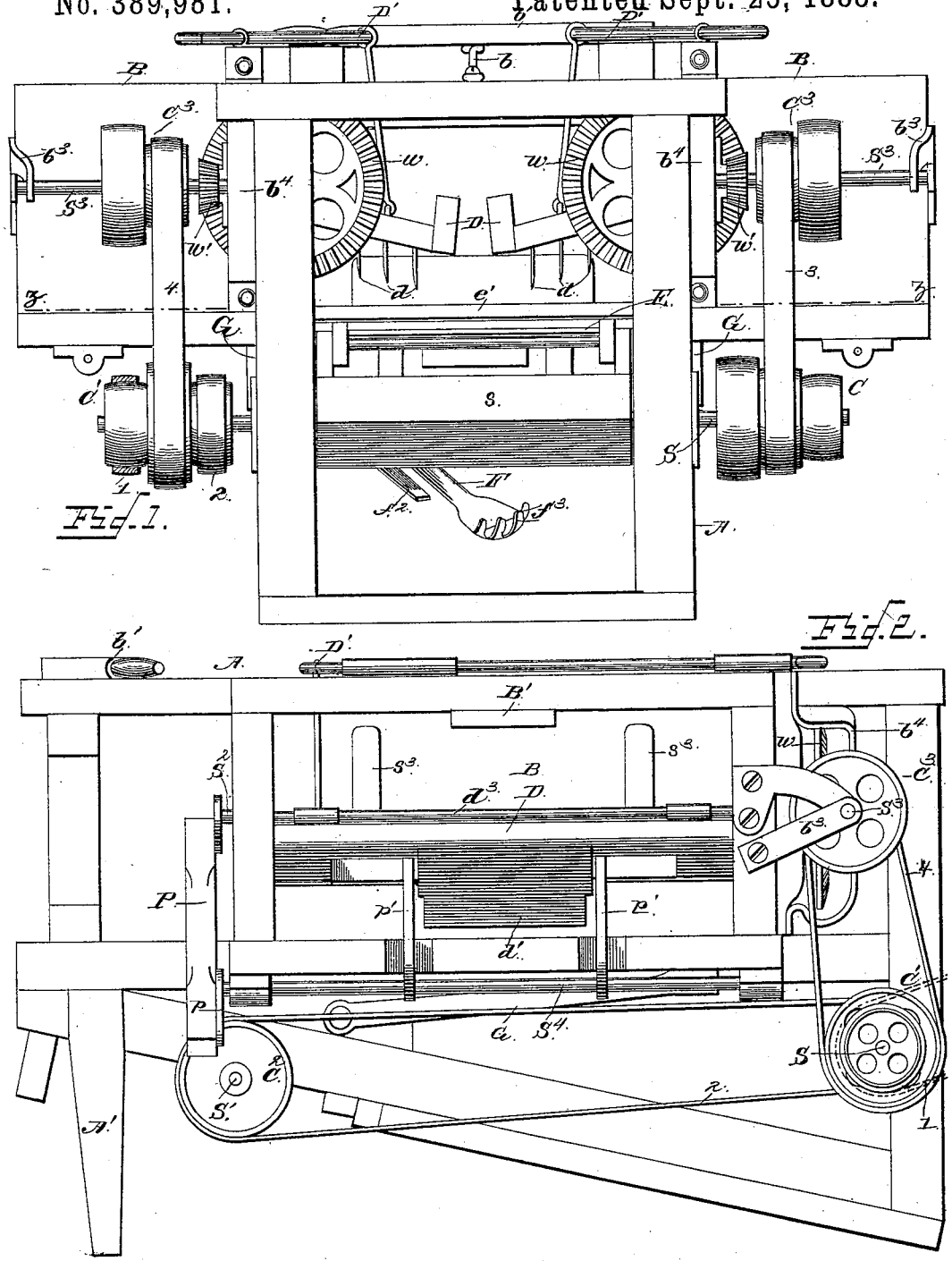

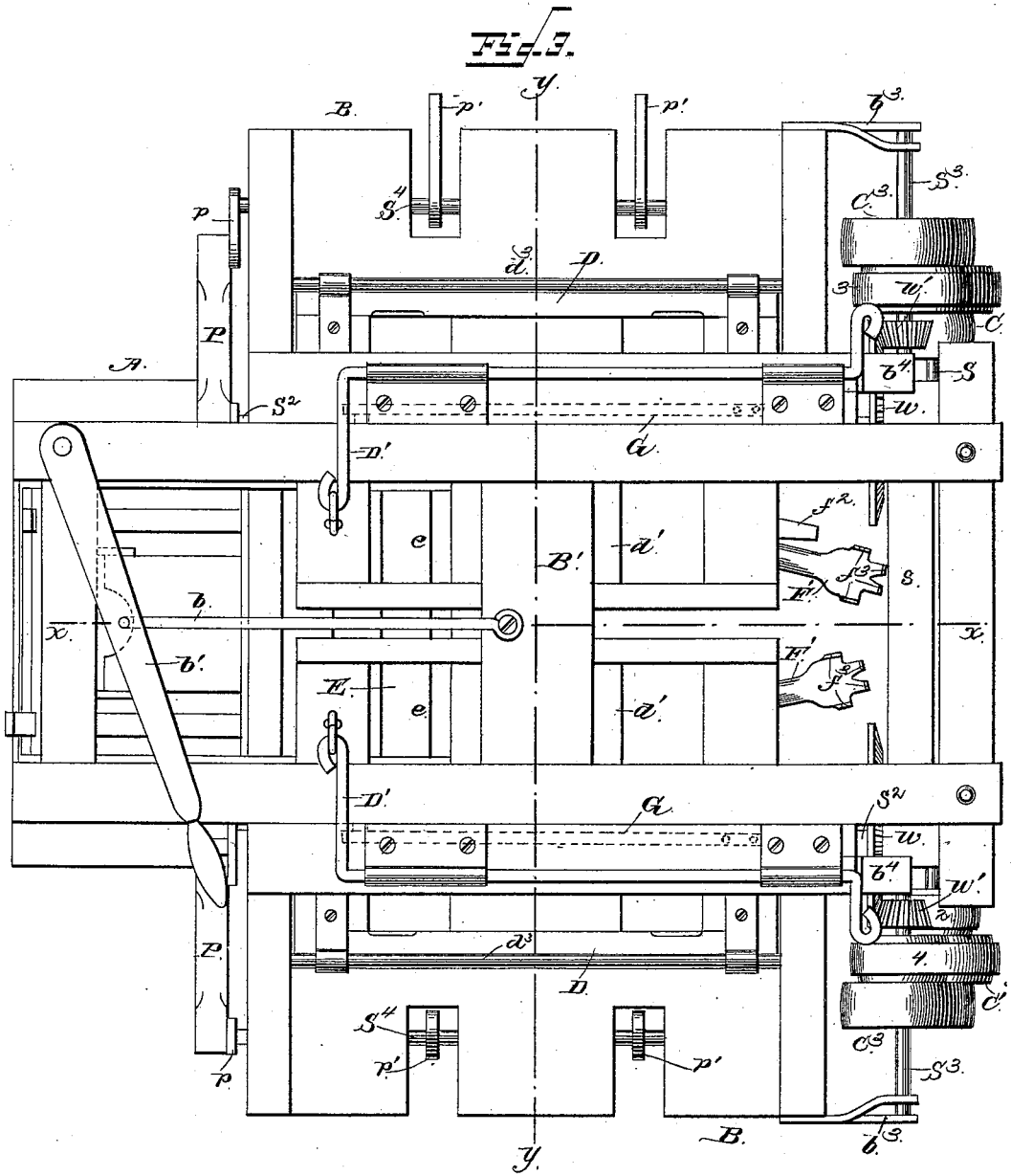

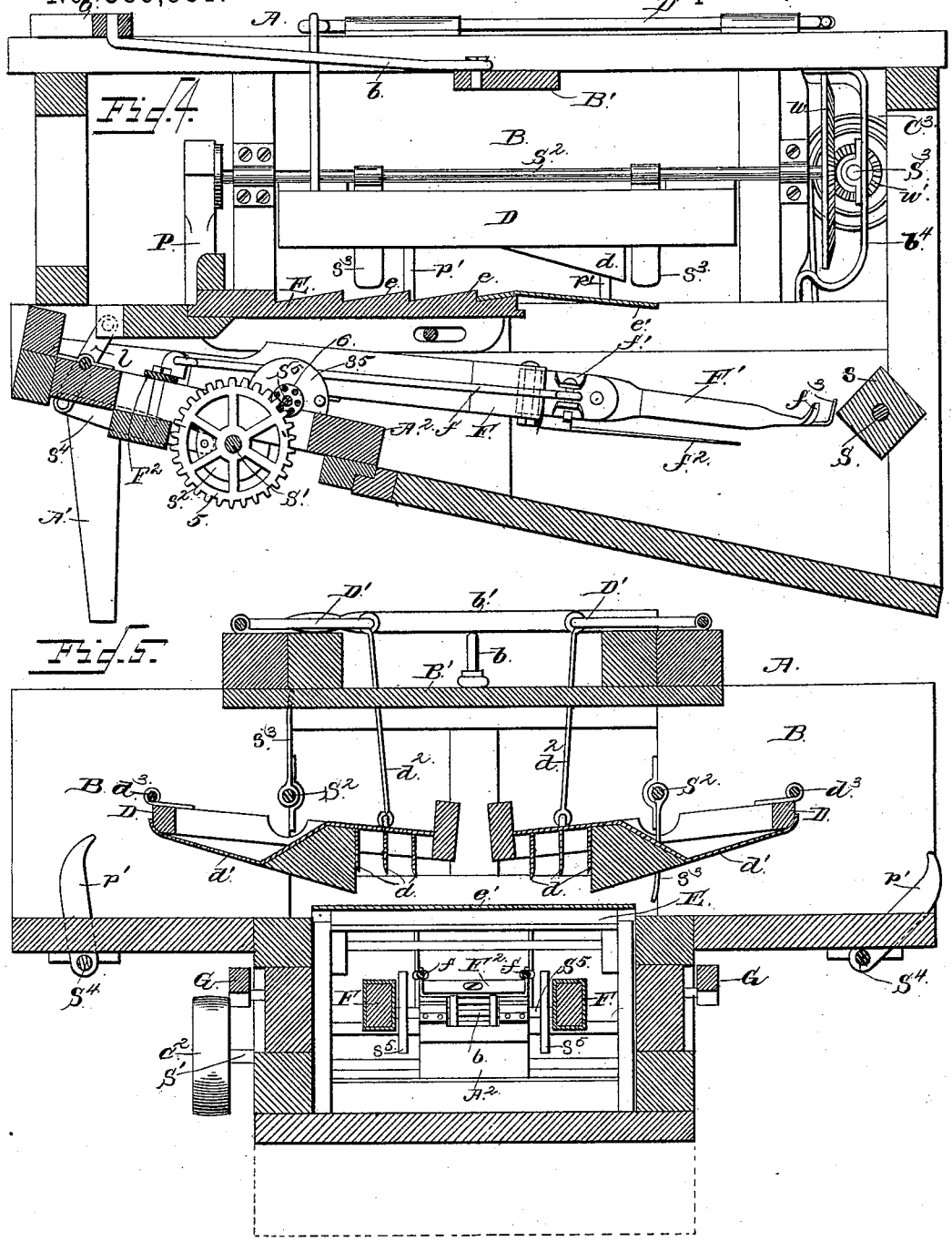

(No Model.) 4 Sheets—Sheet 4.
J. N. SCHMELTZER.
COMBINED BAND CUTTER AND FEEDER.

No. 389,981. Patented Sept. 25, 1888.

Witnesses
M. Fowler
E. G. Siggers

Inventor
John N. Schmeltzer
By his Attorneys
C. A. Snowden

UNITED STATES PATENT OFFICE.

JOHN N. SCHMELTZER, OF AVOCA, ASSIGNOR OF ONE-HALF TO GEORGE LAMPE, JR., OF HIGHLAND, WISCONSIN.

COMBINED BAND-CUTTER AND FEEDER.

SPECIFICATION forming part of Letters Patent No. 389,981, dated September 25, 1888.

Application filed May 31, 1887. Serial No. 239,860. (No model.)

*To all whom it may concern:*

Be it known that I, JOHN N. SCHMELTZER, a citizen of the United States, residing at Avoca, in the county of Iowa and State of Wisconsin, have invented a new and useful Improvement in Combined Band-Cutter and Feeder, of which the following is a specification.

My invention relates to a combined band-cutter and feeder; and it consists in the construction and arrangement of the parts of the same, which will be more fully hereinafter described, and pointed out in the claims.

The object of my invention is to provide a combined band-cutter and feeder which is simple and effective in its construction and operation, strong and durable, easily handled and readily understood, positive in its ultimate result, and readily set up in connection with a thrasher. I attain this object by the mechanism illustrated in the accompanying drawings, wherein like letters of reference indicate similar parts in the several views, and in which—

Figure 1 is a front elevation of my improved band-cutter and feeder. Fig. 2 is a side elevation of the same. Fig. 3 is a top plan view thereof. Fig. 4 is a longitudinal vertical section on the line $x\,x$ of Fig. 3. Fig. 5 is a transverse section on the line $y\,y$ of Fig. 3. Fig. 6 is a horizontal section on the line $z\,z$ of Fig. 1.

A indicates the frame-work, the lower forward portion of which is inclined downward, and from thence runs rearwardly on an incline, and is supported by suitable feet or short standards, A' A'. The upper portion of this frame-work A is open and clear to give an easy and positive operation of the mechanism thereby supported, and the lower portion of the said frame is inclosed, for a purpose which will be readily understood.

On each side of the upper portion of the frame-work A two feed-ways, B B, are mounted, which are adapted to permit the bound sheaves of grain to be moved therein to the cutting-knives of the machine. These two side feedways, as will be readily seen, are connected with the ordinary feeding-table, and the upper part of the frame-work of each is secured to a transverse beam, B', which has a rod, $b$, secured to its central portion, and, extending back, is attached to a lever, $b'$, pivoted on one side of the top of the frame A. By this arrangement the feedways may be moved back and forth on the frame by moving the lever $b'$. In the lower portion of the forward part of the frame A a shaft, S, passes transversely therethrough and runs through a sheave-block, $s$, in the open end of the said frame, and has a series of pulleys keyed to each side thereof, which vary in diameter for the purpose of increasing or decreasing the speed of the machine, as will be readily understood.

The pulleys C on one side of the machine are arranged in the form of a cone-pulley, and the pulleys C' on the opposite side are constructed with a central pulley of large diameter and a smaller pulley arranged on each side thereof. The smaller pulley of this series of pulleys C', adjacent to the frame-work A, is encircled by a belt, 1, which runs to the thrasher, (not shown,) and by which motion is imparted to the machine. From the opposite pulley of this series of pulleys C' a belt, 2, encircles the same and runs to the rear portion of the machine, under one of the feedways, and encircles a pulley, $C^2$, mounted on the shaft S', which runs transversely of the machine, and is secured in bearings on the under side of the frame A to operate mechanism which will be more fully hereinafter described.

On the inner portion of the feedways B B a shaft, $S^2$, runs longitudinally of the machine, and on the forward end of each shaft gear-wheels $w\,w$ are mounted and secured. In the front portion of each of the feedways suitable hangers, $b^3\,b^4$, are secured and project outwardly, in which a short transverse shaft, $S^3$, is mounted, having a series of pulleys, $C^3$, of increasing diameters, and on its innermost end has a small beveled gear-wheel, $w'$, which engages with the gear-wheel $w$, heretofore described. A belt, 3, runs from the series of pulleys C and passes over the pulleys $C^3$, and by this means the motion is transmitted from said pulley to the pulley $C^3$, and through the medium of the small beveled gear-wheel $w'$ to the large beveled gears $w$. On the opposite side of the machine a belt, 4, runs from the series of pulleys C' and encircles a like series of pulleys similar in construction and for the same purpose as the pulley C³.

To the rear end of each shaft S² a pitman, P, is eccentrically connected, and thence extends downward on an incline, and is secured to a crank, p, mounted on the end of a rock-shaft, S⁴, passing under the outer edge of each of the feedways B. At regular intervals on the rock-shafts S⁴ suitable feeding-arms, p' p', are attached and project upwardly through slots in the bottom of the frame-work of the feedways, and as the shafts S² are revolved the pitmen P are set in motion, and through the medium of the cranks p the said arms p' p' are given an oscillating motion, which facilitates the feed of the grain to the knives.

At regular intervals on the shaft S² metallic curved fingers s³ s³ are rigidly secured, which revolve through slots or openings in the knife-frame D. By means of these fingers the bundles or sheaves of the bound grain are drawn under the knives and guided thereby in such a position as to more readily facilitate the positive action of the cutting of the bands encircling said sheaves. These knife-frames D are provided with suitable longitudinal cutting-knives, d, having longitudinal inclined lower cutting-edges depending from the lower side thereof, as shown in Figs. 4 and 5, and are covered by a metallic sheathing, d', which prevents chaff and dust from flying upward. These knife-frames are held normally in their lowest position, and the sheaves are fed thereto and under and against the cutting-edges of the knives by a feed-table, presently referred to, thereby severing the bands. The said frames are hinged to the feedways B B by rods d³, passing through loops secured to the outer portion of said knife-frames, and their inner ends have rods d² attached thereto, which pass upwardly to the top portion of the machine, and are adapted to be secured or attached removably to levers or arms D' D'. By means of these levers D' the said knife-frames D D are adapted to be raised from operative engagement or position by simply pressing down the outer end of the lever D', and thereby providing means by which a clear access may be gained to the inner portion of the machine under the knives. As hereinbefore described, the frame-work carrying these feedways B B is adapted to be slid backward and forward toward or from the front portion of the machine, and by this means the whole frame acts as a belt-tightener, and at the same time adapts the machine for cutting the bands of longer bundles of grain. Between the feedways B B a table or feed-plate, E, is situated, which is provided with a series of corrugations, e, and to the forward end of this table E a chute or guide-plate, e', is secured, over which the grain passes to the thrashing-cylinder. Immediately under this table E a feed mechanism is situated, and is controlled and operated by the pulley C² on the shaft S', hereinbefore referred to. In the central portion of this shaft a spur wheel or gear, 5, is mounted and secured, which engages with a pinion, 6, mounted in the center of the crank-shaft S⁵, journaled on a supporting-beam, A², which supports the mechanism entire.

On the inner end of the shaft S' an eccentric, s², is secured, to the wrist pin of which a short pitman, s⁴, is attached, and the other end of said pitman is secured to a link-plate, l, which projects upwardly, and is secured to a projection on the rear portion of the table E. A link-plate, Z, of similar form, connects the opposite side of the frame or beam A² to the opposite side of the projection of the table E. By this means the table E is moved backward and forward or shaken, which motion conveys the bundles of grain after the bands have been cut over the chute e'. On each outer end of the shaft S⁵ eccentrics s⁵ are secured, and to the wrist-pins of these eccentrics long arms F F are secured, which pass forward to the front of the machine and have long metallic hinged portions F' F' secured pivotally to the forward portion thereof. These forward portions F' of the arms F F project downwardly toward the forward end of the machine and are given a four-motion feed. To each inner side of the said portions F' of the arms projections or ears f' are formed, to which rods f f are secured and extend backwardly toward the rear of the machine and are connected to the two ends of the pivoted plate F² in the rear of the shafts S' S⁵. By means of these rods f f the said projecting portions F' of the feed-arms are adapted to be drawn inward against the action of the eccentrics secured to the ends of the shaft S⁴. The motion of these eccentrics on the arms F, and consequently of the portions F' thereof, will be as follows: The said arms F' being eccentrically mounted, as is understood, at one revolution of the shaft S⁴ the said arms F will be lowered, and as the wrist-pin of the said eccentrics revolves toward the rear of the frame of the machine the said arms will be drawn backward thereby, and when the wrist-pin reaches its highest point the arms will be raised, and if the revolution of the said shaft continues the wrist-pin returns to its forward position and the arms are shot forward. The two arms F F are so attached to the said eccentrics that while the one is in an elevated position the other will be in a reverse position. This is accomplished by placing the wrist-pins on the eccentrics of the said shaft S⁴ in reverse positions, and the operation thereof and consequent movement therefrom will be readily understood. When the arms F are projected forward by the action of the eccentrics, as just described, the pivoted portions F' will be acted upon by their governing-rods f, which will draw the said portions F' inward and decrease their length, and when the said rods are elevated they will of necessity shoot or force the portions F' outwardly in a straight line. By this means it will be seen that the arms F, with their hinged portions F', have a forward and downward shoot and an upward elevation, covering the whole space under the chute $e'$, and taking the grain as it is fed over said chute and spreading and separating it into an even layer to be fed into the cylinder of the thrasher.

To guard against any escape or passage of the grain down on each side of the arm, suitable projections or metallic fingers, $f^2$, are secured to the forward portions, $F'$, thereof. These fingers $f^2$ cover the space during the operation of the said arms between the said outer pivoted portion, $F'$, of the arms and the sides of the frame of the machine. The outer ends of the portions $F'$ are slightly flattened and are provided with agitating-fingers $f^3$, which are formed integral therewith, and the function of which will be readily seen. The rear portions of the said arms F pass through apertures in the rear portion of the frame of the machine, and are thereby steadied in their movement.

The frame-work in which the feed mechanism just described is arranged is secured to the feedways by tie-rods G G, connected at their opposite ends to the under sides of the bottoms of the feedways and the sides of the frame inclosing the feed mechanism, and by this means, as the said shifting frame is slid backward or forward, the said feed-arms and the mechanism in connection therewith are in a similar manner drawn backward and forward, so that the whole mechanism, both band-cutting and feeding, is adjusted at a single operation. It will be understood that the several parts will have been constructed previously to arrange themselves in the proper position when the machine has thus been adjusted.

The operation of this machine is well understood, and the purposes for which it is intended being well known it is unnecessary to further enlarge upon the same herein.

It is obvious that many minor changes in the construction and arrangement of parts may be made and substituted for those shown and described without in the least departing from the nature and principle of my invention.

Having thus described my invention, I claim—

1. The combination, in a band-cutter and feeder, of the main frame, the reciprocating table therein, the feedways movable on opposite sides of the main frame, the bar $B'$, connecting said feedways, the frames secured to the feedways, arranged over the table, and having the knives, and the lever $b'$, fulcrumed to the main frame and connected to the bars $B'$ and adapted to move the feedways, substantially as described.

2. The combination of the longitudinally-movable arms F, having the hinged extensions $F'$, with the eccentrics connected to and operating the said arms, the pivoted plate $F^2$, and the rods connecting the ends thereof to the extensions $F'$, whereby four-way motion will be imparted to the latter, substantially as described.

3. The combination of the longitudinally-movable arms F, having the hinged extensions $F'$, provided with fingers $f^2$, with the eccentrics connected to and operating the said arms, the pivoted plate $F^2$, and the rods connecting the ends of said plate to the extensions $F'$, substantially as described.

4. The combination of the main frame, the shafts $S'$ in the rear portion thereof, the reciprocating feed-table, the arm F, having the extension $F'$ arranged below the feed-table, intermediate gearing connecting both the feed-table and the arm F to the shafts $S'$, and means for rotating said shafts, as set forth.

5. The combination of the main frame, the feedways on the sides thereof, the knife-frames arranged in the feedways, the feed-table arranged in the main frame and projecting under the knife-frames, the arms F, arranged under the feed-table and having the hinged extensions $F'$, the shaft $S'$ in the rear portion of the main frame, means for rotating said shaft, and mechanism driven by said shaft, whereby the feed-table will be reciprocated and a four-way motion given to the extensions $F'$ of the arms F, as set forth.

6. The combination of the main frame, the feedways on the side of the same, the slotted knife-frame hinged within the feedway and having the depending knives provided with inclined lower cutting-edges, the lever mounted above the feedway and connected to the knife-frame to raise and lower the same, the shaft $S^2$, mounted in the feedway above the knife-frame, the shaft $S^4$, journaled on the bottom of the feedway, the pitman connecting said shafts, the arms $S^3$ on the shafts $S^2$, playing through the slots in the knife-frame, the arms $p'$ on the shaft $S^4$, the reciprocating feed-table within the main frame, and suitable operating mechanism, as set forth.

In testimony that I claim the foregoing as my own I have hereto affixed my signature in presence of two witnesses.

JOHN N. SCHMELTZER.

Witnesses:
 GEO. BURTON,
 H. P. DIETRICH.